Sept. 29, 1936.  G. LAUBE ET AL  2,055,747

DIRIGIBLE TRUCK

Original Filed May 4, 1935

INVENTORS
Grover Laube.
BY Robert C. Stevens.
Edwin A. Kaufman.
ATTORNEY

Patented Sept. 29, 1936

2,055,747

UNITED STATES PATENT OFFICE 2,055,747

DIRIGIBLE TRUCK

Grover Laube, Los Angeles, Robert Colby Stevens, Long Beach, and Edwin Albert Kaufman, Los Angeles, Calif., assignors to Twentieth Century-Fox Film Corporation, Beverly Hills, Calif., a corporation of New York Original application May 4, 1935, Serial No. 19,832. Divided and this application April 17, 1936, Serial No. 74,930

13 Claims. (Cl. 280—103)

This invention relates to dirigible trucks and deals particularly with improvements in the steering device of such trucks.

The hereinafter described invention is a divisional part of a co-pending application, Serial Number 19,832, filed May 4, 1935, entitled Camera carriage.

One of the objects of this invention is to provide a steering gear for dirigible trucks whereby one pair of wheels may be manipulated so that the truck will pivot on the other pair of wheels, or preferably on a point between the two wheels.

Another object is to provide improvements in a means for manipulating a pair of wheels in the manner described, said means embodying sprockets and chains associated with the wheels, together with means for causing the chain to progressively change in length while traveling around the sprockets.

A further object is to provide means for differentially swinging the wheels on their frame supports to force each wheel to assume a plane substantially perpendicular to the turning radius for every degree of turning.

Other objects and advantages will appear as the description proceeds in conjunction with the drawing in which.

Figure 1:
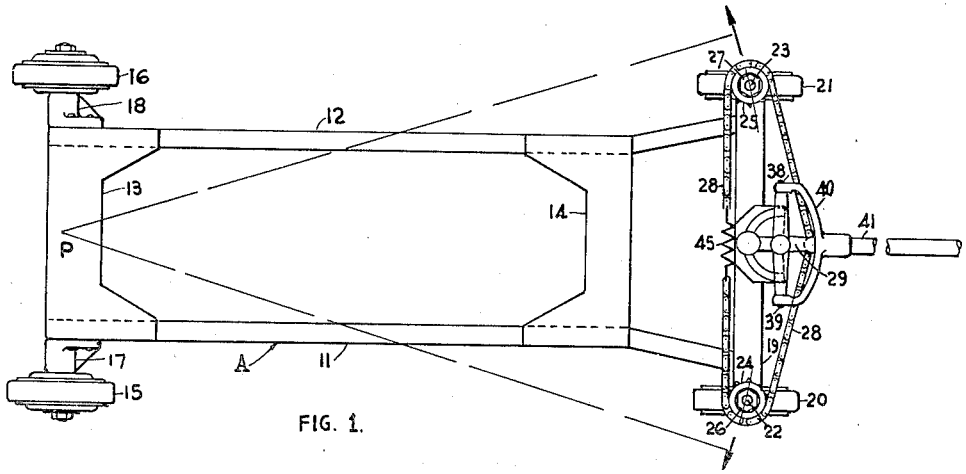
Figure 1 is a plan view of a truck showing the invention as applied to the steering gear.
Figure 2:
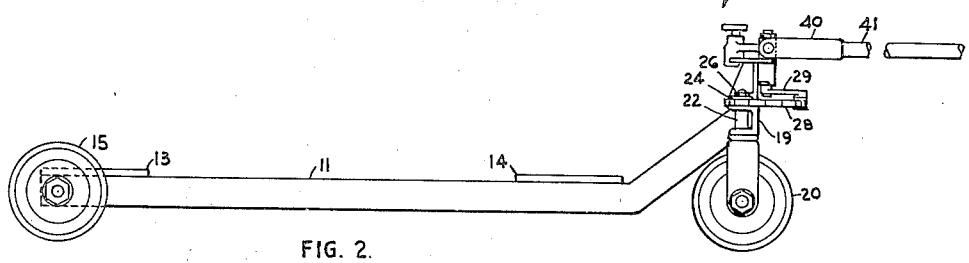
Figure 2 is a side elevation of Figure 1.

Referring to the drawing and particularly to Figures 1 and 2, it will be observed that we have shown our invention in combination with a truck A. The truck comprises frame members 11 and 12 connected by cross plates 13 and 14. On the rear of the truck we mount wheels 15 and 16 in any suitable manner such as by hubs 17 and 18. In Figure 2, it will be noted that the frame members 11 and 12 slope upwardly at the front end of the truck and are connected by a cross member 19, said cross member being in the form of a channel for obvious purposes of construction.

Figure 3:
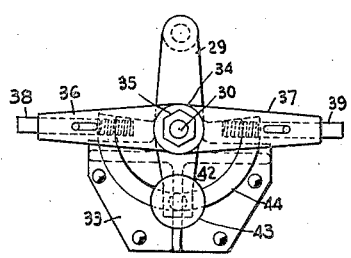
Figure 3 is an enlarged view of part of the mechanism.
Figure 4:
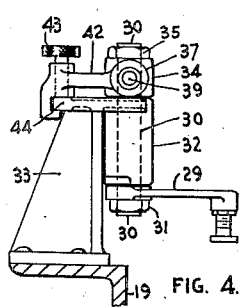
Figure 4 is a side view of Figure 3.

On the cross member 19 we mount our invention for steering and in conformance with the objects of the invention we mount the front wheels 20 and 21 so that they may be differentially swung on their frame pivots. For this purpose we mount the wheels 20 and 21 in wheel carrying brackets, said brackets having extending shafts 22 and 23 extending through and pivotally mounted in the cross member 19. On the upper ends of the shafts we fix sprockets 24 and 25 which are held in place by nuts 26 and 27 and around the sprockets we provide a connected chain 28. As before stated, it is one of the objects of the invention to provide means for causing the chain to progressively change in length while traveling around the sprockets. Accordingly, we connect the midpoint of the front run of the chain to a swinging arm 29. The means for swinging the arm 29 is best illustrated in Figures 3 and 4. Here it will be seen that the arm 29 is mounted upon a shaft 30 and is held fixed to the shaft by a nut 31. The shaft 30 in turn is rotatably mounted in a bearing member 32, said bearing member being suitably mounted upon or cast integral with a supporting member 33, and the supporting member being mounted upon the cross member 19. Upon the upper end of the shaft 30 we secure a hub 34 in any suitable manner such as by means of a nut 35. The hub 34 is formed with radial arms 36 and 37, said arms being equipped with spring impelled plungers 38 and 39 adapted to be yieldably withdrawn into their respective arms. A yoke 40 having holes in each end of the yoke adapted to receive the plungers may then be slid over the ends of the arms and the plungers released into the holes in the ends of the yoke. In this manner the yoke may be detachably mounted on the steering device. A tongue 41 is suitably connected to the yoke. The hub 34 also is formed with another arm 42 having a boss at the outer end into which a set screw 43 is screw threadedly mounted. The set screw 43 is arranged to engage a segment 44 carried by the supporting member 33 and is for the purpose of locking the hub 34 and the shaft 30 in fixed positions for steering the truck. As shown in Figure 1, the arm 29 is substantially at right angles to the arms 36 and 37 and is arranged to extend forwardly of the front side of the sprockets 24 and 25. Consequently the forward run of the chain 28 is forced into an angle, thus increasing the length of the chain between the sprockets 24 and 25 on the forward side. As the arm 29 is swung in response to turning the tongue 41, the chain 28 is drawn around the sprockets 24 and 25 and the wheels 20 and 21 are swung on their pivotal shafts 22 and 23. Upon analysis it will be found that one of the wheels is swung more than the other, the difference depending upon which way the tongue 41 is turned. This is due to the chain changing in length between the sprockets on the forward run, the change in length being brought about by the arm 29 swinging from an offset relation to an aligned relation with respect to the forward run of the chain between the two sprockets. In order to compensate for the change in length of the chain we incorporate a spring 45 in the chain on the opposite run of the chain from the arm 29.

Figure 5:
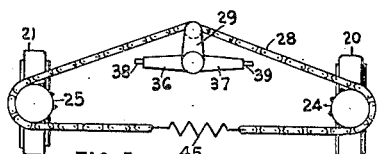
Figure 5 is a diagrammatic view of the steering mechanism showing the wheels set for forward movement of the truck.
Figure 6:
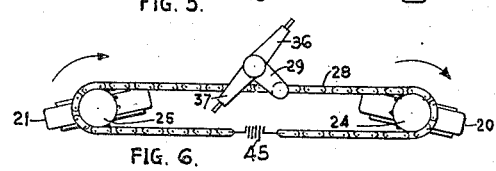
Figure 6 is a view similar to Figure 5, but shows the wheels set for a pivoting movement of the truck.

Referring to Figures 5 and 6 it will be seen how the steering device operates to turn one wheel more than the other. In Figure 5 the arm 29 is set in position to move the truck forward and the wheels 20 and 21 are accordingly parallel for forward travel. In this position, the chain is forced into an angle between the sprockets on the forward run and is obviously lengthened on this side of the sprockets. The spring 45 compensates for this increased length. In Figure 6, the arm 29 is turned to pivot the truck on the point P, Figure 1, and the chain runs straight between the sprockets on both sides. Obviously, there has been a change in the length of the chain on the forward side of the sprockets and this change has been in accordance with the swinging of the arm 29. But the swinging of the arm 29 has been in an arc, consequently the change in chain length has been non-uniform. It is this non-uniform change in chain length that is utilized in our invention to give a progressive change in the swinging of the wheels in their frame pivots. In addition to the progressive change, the chain also swings the wheels differentially. In Figure 6, it can be seen how a differential swinging is applied to the two wheels 20 and 21. As the arm 29 is swung toward the wheel 20, the change in chain length between the arm and the wheel 20 is greater than the change between the arm and the wheel 21. Therefore, the wheel 20 is rotated farther on its pivot than the wheel 21, which is shown in Figure 6. By properly calculating the length of the arm 29 and the distance of the pivot point P, in combination with the non-uniform change in chain length, the steering arrangement may be designed to yield the proper swinging movement for each wheel so as to bring each wheel perpendicular to its turning radius for every degree of swinging of the tongue 41.

Figure 7:
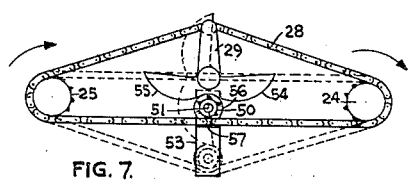
Figure 7 is a diagrammatic view of another form of the invention.
Figure 8:
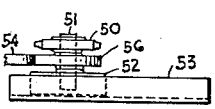
Figure 8 is an enlarged view of part of the mechanism shown in Figure 7.

In Figures 7 and 8 we show a form of our invention whereby the change in chain length is compensated for by a take up sprocket arrangement. In these views, the chain 28 is an endless chain running around the sprockets 24 and 25 and is connected to the arm 29 in the same manner as heretofore described. Upon swinging the arm 29, the same difference in chain length in the forward run of the chain is obtained and the wheels 20 and 21 are swung upon their frame pivots in the same ratio as heretofore explained. The only difference between this form and the preceding form lies in the manner of compensating for the change in chain length. Instead of using a spring, we use a sprocket 50 rotatably mounted on a spindle 51, said spindle being mounted on a slidable block 52. The block 52 is arranged to slide in a track 53 that can be suitably mounted on any part of the truck. The sprocket 50 is arranged to engage the chain 28 on the rear side of the sprockets and is adapted to be held in constant engagement with the chain by means of a cam 54 bearing against a roller 56 mounted on the spindle 51. As the arm 29 is swung and the chain is shortened on the forward run, the cam 54 swings with arm and is designed to push the sprocket 50 outwardly on the track 53 the exact amount necessary to compensate for the change in chain length. In this manner the chain is kept tight around the sprockets for all positions of the arm 29. The double cam arrangement comprising the cam 55 is necessary to allow for turning in either direction. This form of our invention is positive, inasmuch as it does not depend upon a spring for any force required in turning, and may find usefulness in extra heavy equipment.

The truck embodied in this invention has been designed for use as a camera carriage for mounting motion picture cameras in studio practice, but may become useful wherever it is required to move a truck in precise prescribed lines of travel.

We claim:

1. A dirigible truck comprising: a frame; supporting wheels mounted on said frame; a pair of wheels having wheel carrying brackets pivotally mounted on said frame; means for swinging said wheels on their frame pivots, said means including a sprocket associated with each wheel and adapted to swing the wheel carrying bracket on its frame pivot, a chain around said sprockets, and means for causing said chain to travel around said sprockets and progressively change in length while traveling.

2. A structure as set forth in claim 1 in which said last mentioned means comprises a swingable arm having its free end connected to a run of the chain at a point intermediate of the sprockets, the free end of said arm being arranged to swing from an offset relation to an aligned relation with respect to a straight run of the chain between the sprockets.

3. A dirigible truck comprising: a frame; supporting wheels mounted at the corners of said frame, a pair of said wheels having wheel carrying brackets pivotally mounted on said frame; and means for turning said wheel carrying brackets on their frame pivots to steer said carriage, said means including a sprocket associated with each bracket and arranged to turn the same in its frame pivot, a chain around said sprockets and means for causing said chain to change in length while traveling around said sprockets.

4. A dirigible truck comprising: a frame; supporting wheels mounted on the corners of said frame, a pair of said wheels having wheel carrying brackets pivotally mounted on the frame; and means for turning said wheel carrying brackets on their frame pivots, said means including a sprocket associated with each bracket and arranged to turn the same on its frame pivot, a chain around said sprockets, an arm connected to said chain and means for turning said arm on a pivot to cause said chain to travel around said sprockets and change in length while traveling.

5. A dirigible truck comprising: a frame; supporting wheels mounted on the corners of said frame, a pair of said wheels having wheel carrying brackets pivotally mounted on the frame; and means for turning said wheel carrying brackets on their frame pivots, said means including a sprocket associated with each bracket and arranged to turn the same on its frame pivot, a chain around said sprockets, an arm connected to said chain, means for turning said arm on a pivot to cause said chain to travel around said sprockets and change in length while traveling and means for locking said arm at selective points of turning to hold said chain fixed.

6. A dirigible truck comprising: a frame; supporting wheels mounted on the corners of said frame, a pair of said wheels having wheel carrying brackets pivotally mounted on the frame; and means for turning said wheel carrying brackets on the frame pivots, said means including a sprocket associated with each bracket and arranged to turn the same on its frame pivot, a chain around said sprockets, a pivotally mounted arm connected to said chain, means for turning said arm on its pivot to cause said chain to travel around said sprockets and change in length while traveling, said last mentioned means including a shaft rotatably mounted on said frame and having said arm attached to one end and radially extending arms attached to the opposite end thereof, and a tongue detachably connected to said radial arms.

7. A dirigible truck comprising: a frame; supporting wheels mounted on the corners of said frame, a pair of said wheels having wheel carrying brackets pivotally mounted on the frame, and means for turning said wheel carrying brackets in their frame pivots, said means including, a sprocket associated with each bracket and arranged to turn the same on its frame pivot, a chain around said sprockets, a tension member interconnecting the ends of said chain and means for causing the chain to change in length while traveling around said sprockets.

8. A dirigible truck comprising: a frame; supporting wheels mounted on the corners of said frame, a pair of said wheels having wheel carrying brackets pivotally mounted on the frame; and means for turning said wheel carrying brackets on their frame pivots to steer said carriage, said means including a sprocket associated with each bracket and arranged to turn the same on its frame pivot, a continuous chain around said sprockets and means for causing the chain to travel around the sprockets and change in length in the runs between the sprockets while traveling.

9. A dirigible truck comprising: a frame; supporting wheels mounted on the corners of said frame, a pair of said wheels having wheel carrying brackets pivotally mounted on the frame; and means for turning said wheel carrying brackets on the frame pivots to steer said carriage, said means including, a sprocket associated with each bracket and arranged to turn the same on its frame pivot, a chain around said sprockets, said chain having its ends interconnected, an arm connected to one run of the chain at a point intermediate of the sprockets, means for turning the arm on a pivot to cause the chain to travel around the sprockets and change in length while traveling and means in the opposite run of the chain to compensate for the change in length of the chain.

10. In a steering device, the combination of: a pair of wheels steerably mounted, and means for turning the wheels unequally in their mounting for steering purposes, said means including a sprocket associated with each wheel and adapted to turn the same in its steerable mount, a chain around said sprockets and means for causing the chain to travel unequal lengths around the sprockets.

11. In a steering device, the combination of: a pair of wheels steerably mounted and means for turning the wheels unequally in their mountings for steering purposes, said means including, a sprocket associated with each wheel and adapted to turn the same in its steerable mount, a chain around said sprockets, an arm connected to said chain at an intermediate point between said sprockets, said arm being arranged to cause an extension in the chain between the sprockets, and means for turning said arm upon a pivot to cause said chain to travel around said sprockets and to change said extension in length while the chain is traveling.

12. In a steering device, the combination of: a pair of wheels steerably mounted and means for turning the wheels unequally in their mountings for steering purposes, said means including a sprocket associated with each wheel and adapted to turn the same in its steerable mount, a chain around said sprockets, means for extending the chain on one run between the sprockets, means for varying the extension of said run and means for compensating the variation in said extension in the opposite run of the chain while the chain is traveling.

13. In a steering device, the combination of: a pair of wheels steerably mounted and means for turning the wheels unequally in their mountings for steering purposes, said means including, a sprocket associated with each wheel and adapted to turn the same in its steerable mount, a continuous chain around said sprockets, means for forcing the chain to travel around the sprockets, said last mentioned means including means for causing an extension in the chain in one run between the sprockets and means for proportionally shifting the extension in the chain from one run to the other run while the chain is traveling.

GROVER LAUBE.
ROBERT COLBY STEVENS.
EDWIN ALBERT KAUFMAN.